United States Patent [19]

Condon et al.

[11] 3,846,582

[45] Nov. 5, 1974

[54] DATA TRANSMISSION TERMINAL FOR FSK FREQUENCY DUPLEXED SYSTEMS

[75] Inventors: Joseph Henry Condon, Summit; William Kaminski, West Portal, both of N.J.

[73] Assignee: Bell Telephone Laboratories, Inc., Murray Hill, N.J.

[22] Filed: Aug. 6, 1973

[21] Appl. No.: 385,900

[52] U.S. Cl. .............................. 178/58 R, 179/2 DP

[51] Int. Cl. .............................................. H04l 5/14

[58] Field of Search .................. 178/58 R, 66, 58 A; 179/2 DP

[56] References Cited

UNITED STATES PATENTS

| | | | |
|---|---|---|---|
| 3,655,915 | 4/1972 | Liberman | 179/2 DP |
| 3,753,169 | 8/1973 | Conoon | 333/70 A |
| 3,758,884 | 9/1973 | Bahler | 333/70 A |
| 3,761,816 | 9/1973 | Conoon | 325/22 |
| 3,787,836 | 1/1974 | Hagelbarger | 340/347 DA |

*Primary Examiner*—David L. Stewart
*Attorney, Agent, or Firm*—C. S. Phelan

[57] ABSTRACT

In a multiterminal, frequency duplexed, frequency shift-keyed, data transmission system, each terminal includes controlled, variable-ratio, frequency dividers for dividing down the output frequency of an oscillator to selectable frequencies in different intermediate frequency bands. In each of the latter bands the selectable frequencies are N times the corresponding signal frequencies in the respective duplexed, frequency shift-keyed (FSK) bands. One of the frequency dividers has its division ratio controlled by baseband data signals, and its output is further frequency divided by N to produce FSK signals in one of the system communication bands. The other frequency divider is controlled by a fixed bias to reproduce an output which is N times the higher of the two FSK signals in the other communication band, and output of the latter divider is applied to control the band of operation of a commutating capacitor unit, frequency discriminator. Bands of operation within a terminal are interchanged by simply interchanging the frequency divider ratio control inputs and interchanging the frequency divider output destinations.

17 Claims, 3 Drawing Figures

PATENTED NOV 5 1974 3,846,582

SHEET 1 OF 2

DATA TRANSMISSION TERMINAL FOR FSK FREQUENCY DUPLEXED SYSTEMS

BACKGROUND OF THE INVENTION

1. Field of the Invention

This invention relates to a data transmission terminal for frequency shift-keyed (FSK), frequency duplexed systems. More particularly, the invention relates to terminals for such systems which may be required to send and receive interchangeably in at least two different frequency bands.

2. Description of the Prior Art

Data transmission terminals for FSK, frequency duplexed systems have heretofore employed separate precision band separation filters and frequency generation elements for each of the system operating bands. That need has been a relatively costly aspect of data transmission terminal manufacture; and it does not lend itself to convenient miniaturization, for example, to produce a data set of hand-held size that can perform translations in either direction between baseband and FSK data formats. Digital filter arrangements have been considered for data transmission terminals for reducing the need to employ such expensive frequency generation and frequency band separation circuit elements. However, digital filter arrangements are in and of themselves relatively complex and thus have capabilities considerably beyond the needs for a small and relatively personalized data transmission terminal.

STATEMENT OF THE INVENTION

The foregoing problems of the prior art are mitigated by providing in each terminal of the data transmission system two controllable countdown circuits for deriving from a common oscillator high and low intermediate frequencies at N times the ONE and ZERO frequencies of the system's high and low frequency bands, respectively. A divide-by-N circuit and a frequency discriminator respond to respective intermediate frequency bands for performing terminal transmitter and receiver functions. Only the countdown circuits need to be interchanged in order to switch bands of operation.

BRIEF DESCRIPTION OF THE DRAWINGS

The invention here disclosed may be best understood from a consideration of the following detailed description in connection with the appended claims and the attached drawings in which:

DETAILED DESCRIPTION

Figure 1:
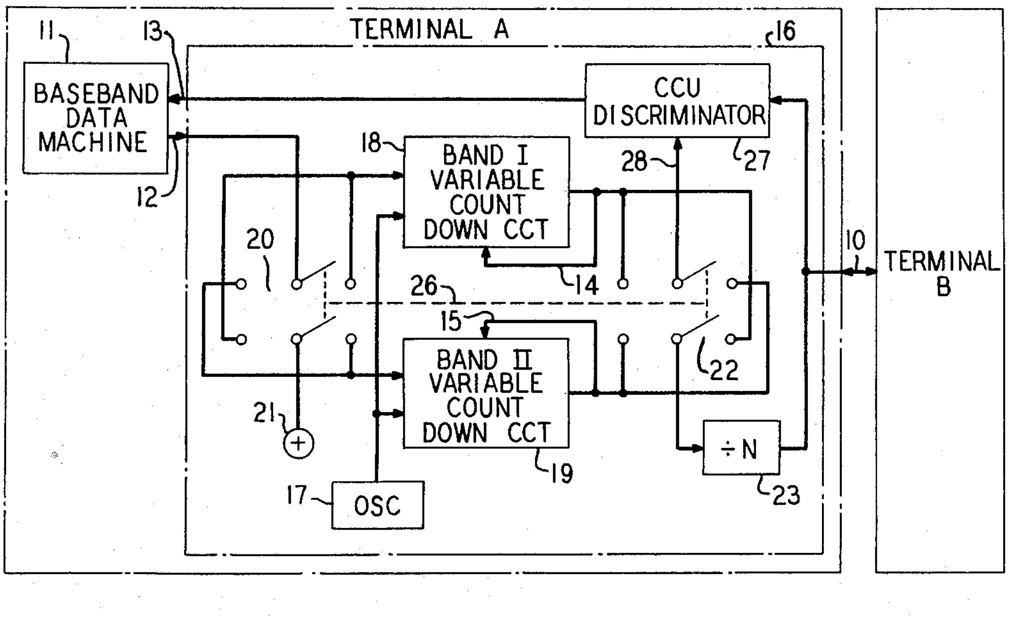
FIG. 1 is a simplified block and line diagram of a telecommunication system utilizing the present invention.

In FIG. 1 two terminals A and B of a multiterminal, frequency duplex, data transmission system are shown. A circuit 10 interconnects those terminals to provide bidirectional signal transmission therebetween on a single pair of wires. The circuit 10 actually schematically further represents a switched communication network, not shown, in which a central switching office is included in the circuit 10 for selectively interconnecting different pairs of the terminals, as well as the illustrated pair, of the system. All terminals are advantageously the same so only one is shown in detail in FIG. 1.

A baseband data machine 11 transmits baseband digital data on a circuit 12 and receives similar data on a circuit 13. Such data is advantageously binary coded and includes binary ONE and binary ZERO bits, sometimes called mark and space signals, respectively, in sequential pulse trains. The machine 11 can take any of a variety of forms including, for example, a conventional computer, or a teletypewriter, or even a simple telephone dial mechanism and a digital display. A data set 16 provides an interface between the baseband signal circuits 12 and 13 and the frequency duplex FSK circuit 10. It is assumed for purposes of illustration that the data set operates in a system such as that presently utilizing Western Electric Co. Type 103 data sets. In that type of system, a data set at a calling terminal utilizes low-band frequencies of 1,070 hertz and 1,270 hertz for transmitting ZERO and ONE signals, respectively. A called data set utilizes high-band frequencies of 2,025 hertz and 2,225 hertz to send ZERO and ONE signals, respectively. Each data set in the system can, of course, be switched to function as either a calling or a called data set.

In the data set 16 of FIG. 1 an oscillator 17 provides a clock signal from which ONE and ZERO frequencies of both the high and the low FSK bands are derived. Such frequencies are advantageously derived by countdown circuits; and one fairly straightforward, though usually expensive, way to do so is to provide from the oscillator 17 an output which is an integral multiple of all four of the desired frequencies. This oscillator output is applied to inputs of a band I variable countdown circuit 18 and a band II variable countdown circuit 19 for deriving in each counter one intermediate frequency, i.e., a frequency of N times an FSK frequency, in a different band. The value of N is determined by the nature of the data set frequency discriminator as will be described. The brute force technique of dividing down an oscillator frequency which is an integral multiple of all ONE and ZERO frequencies requires such a high oscillator frequency that the oscillator cost is also quite high. Accordingly, the data set 16 advantageously employs an oscillator having an output that is not an integral multiple of at least one of the FSK carrier frequencies. In addition, the set employs, for the variable countdown circuits 18 and 19, frequency division circuits which utilize a jittered counting ratio that adequately approximates the desired intermediate frequency, but does so with an oscillator of a much lower frequency than otherwise would be required. This type of frequency division is now known in the art; and an illustrative example is found in the copending U.S.A. application of D. W. Hagelbarger, Ser. No. 263,215, filed June 15, 1972, now U.S. Pat. No. 3,787,836, issued Jan. 22, 1974, entitled "Multitone Telephone Dialing Circuit Employing Digital-to- Analog Tone Synthesis," and assigned to the same assignee as the present application.

Briefly, such a jittered-ratio frequency dividing arrangement as applied to countdown circuits of FIG. 1 employs a shift register (not shown) arranged to simulate a counting system. The shift register receives as shift drive signals the output of oscillator 17 and has a constant binary ONE signal applied to a series data input thereof. Controllable logic (not shown) provides parallel data input to the shift register stages for determining the frequency division ratio of shift register operation, and the latter input is loaded into those stages each time that the final shift register stage produces a binary ONE output signal. The last-mentioned output is the signal at N times an FSK frequency and which will be used in data set 16 in a manner to be subsequently described. Baseband data input from circuit 12 is provided to the control logic to indicate the need for either a ONE or ZERO output intermediate frequency result. Outputs of plural final stages of the shift register are also continuously fed back to provide additional inputs to the control logic for configuring the parallel-loaded data, and thereby determining the amount and frequency of the division ratio jitter represented in the shift register output. Such jitter-controlling feedback is schematically represented for countdown circuits 18 and 19 by feedback leads 14 and 15, respectively.

In FIG. 1 the data output of the machine 11 is coupled by way of a double-pole, double-throw switch 20 to the data, or control, input of one of the variable countdown circuits 18 or 19. When that switch is operated to its right-hand, as illustrated in the drawing, position, those data signals are applied to the data signal input of the band I countdown circuit 18. That is, in the jittered-ratio counting arrangement described hereinbefore, the data signals are applied to the control logic of the shift register to determine whether the counter's output is the ONE or the ZERO intermediate frequency. It is herein assumed that the baseband ONE is a positive voltage and that the baseband ZERO is a ground signal. Assuming that the band I countdown circuit 18 is operating in the lower intermediate frequency band, it produces output signal trains of 1,270 N hertz for a binary ONE and 1,070 N hertz for a binary ZERO. Output from the countdown circuit 18 is coupled through a second double-pole, double-throw switch 22 to the input of a divide-by-N circuit 23 when the switch is in its right-hand, as illustrated in the drawing, circuit closing position. Switches 20 and 22 are advantageously ganged for simultaneous operation, as indicated schematically by a broken line 26 interconnecting the operating arms of those switches, so that both switches go to the right or to the left at the same time.

The output of the divide-by-N circuit 23 includes the FSK signal trains of 1,270 hertz or 1,070 hertz in the low band of ONE and ZERO frequencies. That output is applied to the bidirectional circuit 10 where it is coupled to the terminal B by way of the central office, not shown, and demodulated in a manner which will be described in connection with the further description of the terminal A.

Terminal B simultaneously transmits in the high FSK band the 2,225 hertz ONE signal trains, and the 2,025 hertz ZERO signal trains over the same circuit 10 to the terminal A. This, of course, assumes as previously indicated that the terminal B is at this time operating as a called terminal. In the terminal A the aforementioned signals from the terminal B are received and applied to the input of a commutating capacitor unit discriminator 27. Those signals are advantageously applied by way of a band rejection filter, not shown, but which would be provided in series between the circuit 10 and the input to the discriminator 27 for providing isolation of that input with respect to signals in the output of the divide-by-N counter 23 in the same terminal. An example of such a filter arrangement is taught in the copending U.S.A. application of J. H. Condon, Ser. No. 287,278, filed Sept. 8, 1972, now U.S. Pat. No. 3,761,816, issued Sept. 25, 1973, entitled "Data Set Employing a Commutating Capacitor, Tracking, Notch Filter," and assigned to the same assignee as the present application.

Discriminator 27 is advantageously a commutating capacitor unit (CCU) discriminator of a type to be described in connection with FIGS. 2 and 3. The term "commutating" is employed with reference to a CCU whether or not the unit is at a particular time receiving drive signals for commutating capacitor connections therein. This discriminator converts frequency shift-keyed signals to baseband data signals for application to the baseband data machine 11 for there actuating data processing or display arrangements, e.g., a teletypewriter or other alphanumeric devices. In order to carry out such frequency discrimination, the discriminator 27 receives at a control input lead 28 thereof a drive signal for commutating capacitor connections in the discriminator commutating capacitor units. That control signal is the higher one of the N times ONE or N times ZERO intermediate frequencies in the receiving band of the terminal. For a calling terminal in the present illustrative embodiment, the control signal is the 2,225 N hertz signal from the band II variable countdown circuit 19. That signal is applied by way of switch 22 in its right-hand position. In this mode of operation, the countdown 19 responds to bias from the source 21 applied by way of switch 20 to control its ratio-determining control logic. That bias is at the level of a baseband binary ONE signal on circuit 12.

In order to interchange the role of terminal A from that of a calling terminal to that of a called terminal, switches 20 and 22 are operated to their respective left-hand, as illustrated, positions. This operation interchanges the ratio-controlling, external inputs to variable countdown circuits 18 and 19; and it also interchanges the intermediate frequency output signal destinations for signals from those same counters. The band I countdown circuit 18 continues to operate in the low intermediate frequency band, but it now has the frequency division ratio thereof determined by the voltage from source 21 so that the countdown circuit 18 now produces a 1,270 N hertz signal continuously. The latter signal is coupled by way of the switch 22 and the control input lead 28 to the frequency discriminator 27. Consequently, the band of operation of that discriminator is changed from the high band to the low band. In a similar manner, the band II countdown circuit 19 continues to operate in the high intermediate frequency band; however, it now has its frequency division ratio determined by output data signals from the baseband data machine 11 to produce 2,225 N hertz ONE signals or 2,025 N hertz ZERO signals for application to the divide-by-N circuit 23.

Figure 2:
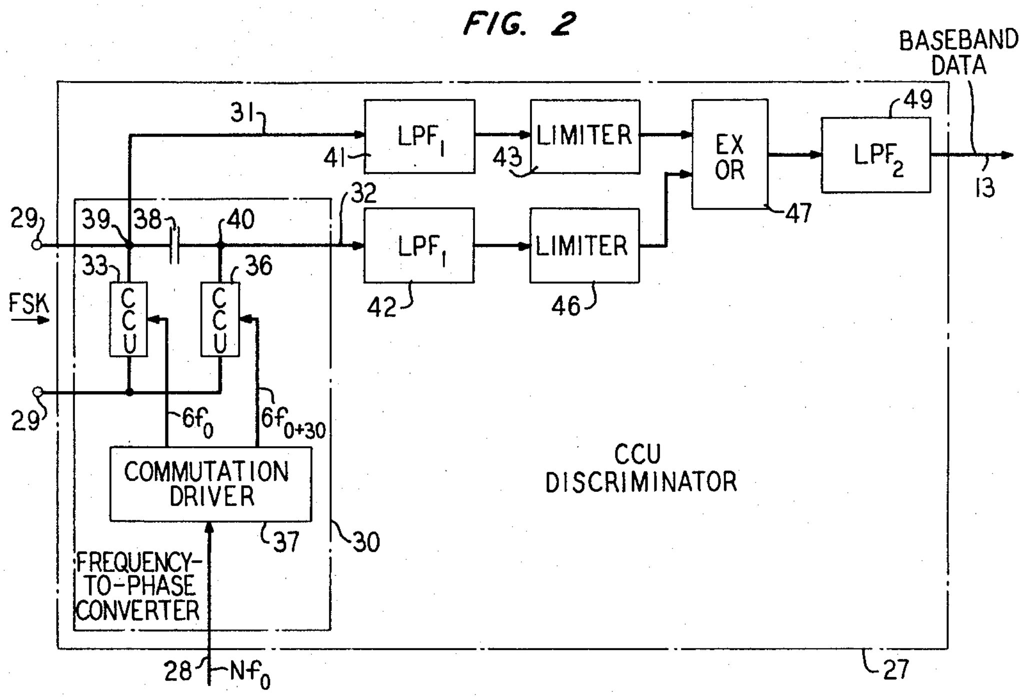
FIG. 2 is a block and line diagram of a frequency discriminator included in terminals of the system of FIG. 1.

FIG. 2 depicts in block and line format the general structure of the CCU frequency discriminator 27. FSK signals from the bidirectional circuit 10 are applied to discriminator input terminals 29, and they are coupled from that circuit point to a frequency-to-phase converter 30. This converter responds to the frequency of input signals applied thereto for producing on leads 31 and 32 signals which have a phase relationship that is indicative of the frequency of an FSK signal at terminals 29. Basically, the converter 30 includes a commutating capacitor unit bandpass filter of the type disclosed and claimed in the copending U.S.A. application of J. H. Condon Ser. No. 279,019, filed Aug. 9, 1972, now U.S. Pat. No. 3,753,169, issued Aug. 14, 1973, entitled "Bandpass Filter Using Plural Commutating Capacitor Units," and assigned to the same assignee as the present application. In that filter two commutating capacitor units 33 and 36 are connected in the shunt paths of a 3-element, $\pi$-section, bandpass filter.

The units 33 and 36 each perform the function of a parallel-tuned, inductance-capacitance, impedance combination; but the frequency of maximum response of such combination is readily varied by varying the frequency of the drive signal which is applied to the units for commutating capacitor connections therein. In the illustrative embodiment, such drive signals are applied on the input control lead 28 at a frequency designated $Nf_0$ for operating a commutation driver 37. The $Nf_0$ signal is advantageously a signal at a frequency of twelve times the frequency to which the units 33 and 36 are to be tuned. As has already been indicated, that frequency is the binary ONE FSK frequency of the terminal receiving band. Driver 37 produces two outputs at $6f_0$ hertz and at thirty degrees phase difference with respect to one another as measured on the $f_0$ hertz, i.e., binary ONE, signal wave at input terminals 29. Thus, a $6f_0$ signal is applied to the commutating capacitor unit 33 and a $6f_{0+30}$ signal is applied to the unit 36. The latter signals cause alteration of capacitor connections in the units in a commutation cycle that recurs at a rate of $f_0$ hertz. Consequently, the factor N is the multiplier that must be applied to the $f_0$ frequency to obtain the frequency of a single signal that is utilized for producing the plural differently phased $6f_0$ hertz signals needed to drive the converter commutating capacitor units.

A reactive impedance is connected in the series signal path of the bandpass filter and is, in the illustrative embodiment, a capacitor 38. This capacitor is connected between the filter shunt paths including the units 33 and 36. The reactance of capacitor 38 is selected so that, when considering two input frequency signals that are a predetermined number of hertz apart in frequency (200 hertz in the illustrative embodiment), voltages at the capacitor terminals 39 and 40 are in phase with one another for the higher of the two frequencies, i.e., the binary ONE FSK signal, and are 180 electrical degrees out of phase at the lower of the two FSK frequencies, i.e., the binary ZERO signal. This relationship holds true for both of the FSK bands here under consideration and is generally true across the frequency spectrum up to frequencies at which distributed reactance effects begin to predominate in the response of the filter.

Signals at the converter filter terminals 39 and 40 are coupled through respective low-pass filters 41 and 42 which are both otherwise herein designated $LPF_1$. Filters 41 and 42 have substantially the same characteristics which include a cutoff frequency that is above the highest anticipated binary ONE FSK signal. FSK signals affected by commutating capacitor units are stepwise approximations of smooth analog signals. Such stepped signals cause ambiguities in the operation of threshold-type circuits, such as those following the filters, and they also cause some pulse width modulation in discriminator output signals. Filters 41 and 42 provide about 12 decibels of attenuation between the FSK signals and signal components at six times the frequency of those signals, the sixth harmonic being the principal offender. Thus, filters 41 and 42 are relatively simple and inexpensive filters for smoothing the FSK signals of both FSK bands in order to eliminate substantially the alternate steps and flats in the waveform.

Outputs of filters 41 and 42 are applied through respective amplitude limiters 43 and 46 to separate inputs of an EXCLUSIVE OR, or multiplier, circuit 47. Although the inputs of the EXCLUSIVE OR circuit normally perform an amplitude threshold function, as is well known in the art, commercial manufacturing tolerances for such circuits are often quite wide and could cause the EXCLUSIVE OR circuit 47 to recognize binary input signal conditions inaccurately. Therefore, limiters 43 and 46 are advantageously included to fix a common threshold level more precisely at a level which is at least equal to the highest anticipated input threshold of the EXCLUSIVE OR circuit 47 so that there is no substantial signal detection ambiguity. These limiters also take out spurious amplitude variations that might be present in the received signal and thereby eliminate the need for a separate limiter at the input terminals 29.

The output of EXCLUSIVE OR circuit 47 is coupled by way of a further low-pass filter 49 to the lead 13 which extends to the data input of the baseband data machine 11. Filter 49, which is otherwise designated as filter $LPF_2$, must be more tightly designed than the filters 41 and 42 because its cutoff frequency must be in a substantially sharper roll-off portion of the filter characteristic at a frequency which is just above the baseband data bit rate. This additional restriction on the characteristic of filter 49 is desirable because the EXCLUSIVE OR function, with respect to the output of the frequency-to-phase converter 30, produces some signal components at twice the baseband data bit rate; and these must be eliminated in order to provide accurate data to the baseband data machine 11. In addition, the filter must pass that bit rate, e.g., 300 bauds, with substantially linear phase response up to at least 200 hertz so that there will be no substantial overshoot on base-band signal transitions provided from discriminator 27 to the data machine 11.

Figure 3:
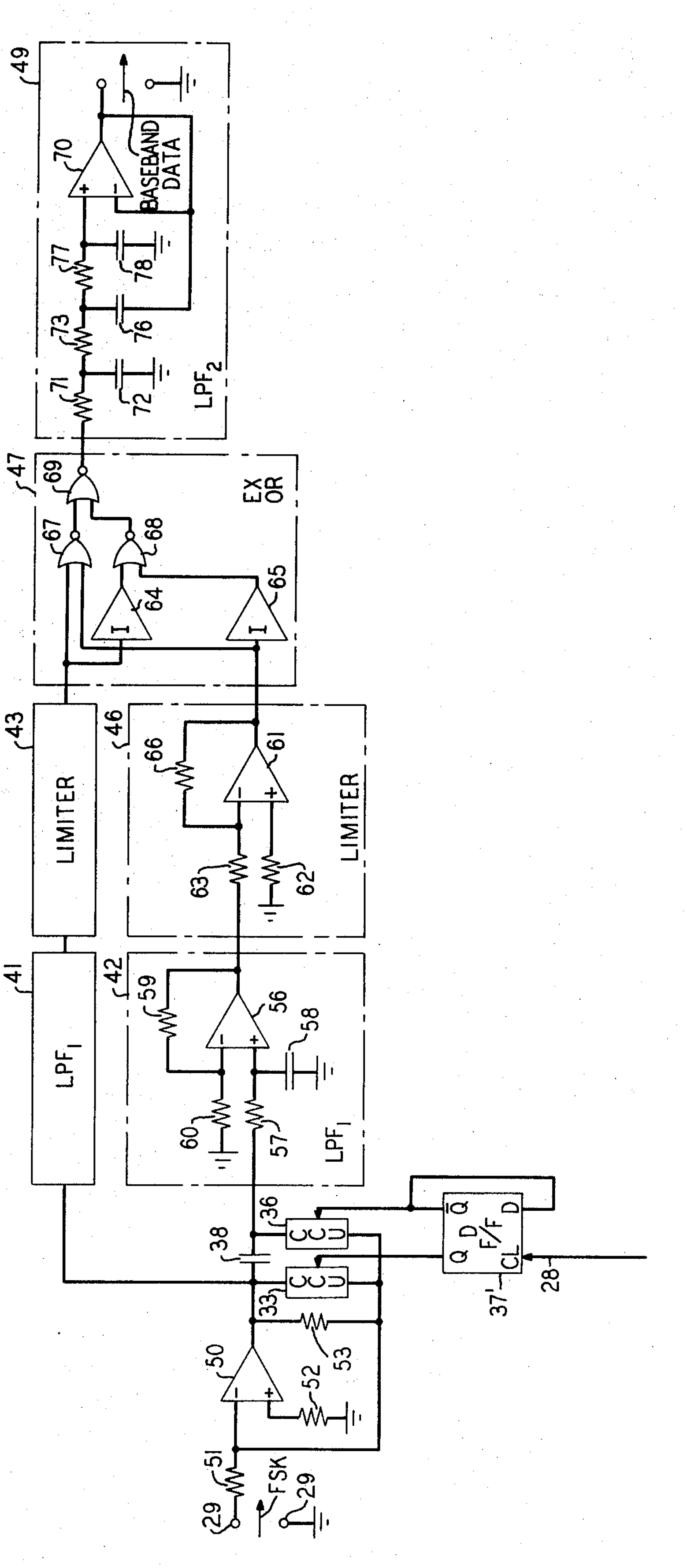
FIG. 3 is a schematic diagram of the frequency discriminator of FIG. 2.

FIG. 3 illustrates details of an implementation for the frequency discriminator generally described in connection with FIG. 2. Numerous operational amplifiers are utilized in the circuit of FIG. 3 and these are advantageously the Fairchild Camera and Instrument Corp. Type 747 amplifiers. Illustrative impedance values will also be noted in the course of the description for a discriminator which is useful in both the high and low FSK bands that are here illustratively considered.

An input amplifier 50 receives FSK signals from the terminals 29 by way of a resistor 51 of 270 kilohms. Such signals are applied to the inverting input of amplifier 50. The noninverting input of that amplifier is grounded through a resistor 52 of 120 kilohms for providing direct current bias stabilization. The input commutating capacitor unit 33 of the bandpass filter is connected in series in the feedback path for amplifier 50. This assures a constant current source for the units 33 and 36 of the filter. A resistor 53 of 270 kilohms shunts the unit 33 to provide damping for linearizing the phase response of the commutating capacitor units in order to obtain good frequency modulation pulse response.

A delay, or D, bistable circuit 37′ is utilized to implement the driver 37 of FIG. 2. Bistable circuit 37′ is clocked by the $Nf_0$ signal on lead 28, which signal is advantageously at a frequency of $12f_0$ hertz. Frequencies of $6f_0$ hertz appear at the Q and Q outputs of the bistable circuit and are applied as the commutating drive for the units 33 and 36, respectively. The Q output is also fed back to the D input of the bistable circuit for resetting that circuit after each triggering operation thereof. Although the $6f_0$ outputs of bistable circuit 37′ are 180 electrical degrees out of phase with respect to each other they are 30 electrical degrees apart as measured on the waveform of the $f_0$ hertz signal at the terminals 29.

In each of the filters 41 and 42, an amplifier 56 is provided with signals at its noninverting input by way of a series resistor 57 from the corresponding one of the units 33 or 36. Resistor 57 has a resistance of 1.8 megohms in order to assure a high input impedance for the filter $LPF_1$. The same noninverting input is grounded through a capacitor 58 of 51 picofarads. Amplifier feedback is provided by a resistor 59 of 510 kilohms to the inverting input of the amplifier, and that input is grounded through a resistor 60 of 10 kilohms.

Each of the limiters 43 and 46 includes an amplifer 61 which has its noninverting input grounded through a resistor 62 of 10 kilohms and receives at the inverting input, by way of a resistor 63 of 10 kilohms, signals from the output of an amplifier 56. Feedback for amplifier 61 is provided by a resistor 66 of 510 kilohms to the inverting input of the amplifier.

The EXCLUSIVE OR circuit 47 illustratively includes 3 NOR gates 67, 68, and 69 and two inverters 64 and 65. NOR gate 67 responds to the outputs of limiters 43 and 46 to produce a high gate output only in the absence of high outputs from both of the limiters at the same time. NOR gate 68 responds to the inverted outputs of the limiters for producing a high gate output only in the presence of simultaneous high outputs from the limiters. Outputs of gates 67 and 68 are applied to NOR gate 69 to cause that gate to produce a high output in the absence of high output from both of the gates 67 and 68, i.e., when only one of the limiters 43 and 46 has a high output.

Filter 49 includes an amplifier 70 which receives the output of EXCLUSIVE OR circuit 47 at the noninverting input connection by way of three resistor-capacitor low-pass filter sections. The first section includes a series resistor 71 of 14.7 kilohms and a shunt capacitor 72 of 100 nanofarads to ground. In the second section a series resistor 73 of 10 kilohms cooperates with a shunt capacitor 76 of 200 nanofarads which extends to the inverting input of amplifer 70. In the third section a series resistor 77 of 23.7 kilohms cooperates with a shunt capacitor 78 of 7.7 nanofarads to ground.

Although the present invention has been described in connection with a particular embodiment thereof, it is to be understood that additional embodiments, modifications, and applications thereof which will be obvious to those skilled in the art are included within the spirit and scope of the invention.

What is claimed is:

1. In a frequency duplex telecommunication system terminal for a frequency shift-keyed system utilizing high frequency band mark and space frequencies for transmission in one direction and low frequency band mark and space frequencies for transmission in the opposite direction, an oscillator, a circuit for counting down the oscillator output to produce mark and space frequencies in one of the mentioned bands, a control circuit for applying the oscillator output to control a terminal receiver including a frequency discriminator, the terminal being CHARACTERIZED IN THAT the countdown circuit and control circuit each include counting devices for providing selectable frequency signals, each of which signals is at a frequency N times a different one of the mentioned mark or space frequencies, the control circuit includes a circuit for controlling the frequency discriminator in response to one of the selectable frequencies in the other of the bands for determining the band of discriminator operation, the countdown circuit further includes an N-counter for dividing the selected frequencies provided by the counting device thereof to produce said mark and space frequencies in the one mentioned band as terminal output signals, and switching arrangements interchangeably provide the selectable frequency signals of the counting devices to the N-counter input and to a control input of the discriminator, respectively.

2. In a frequency duplex telecommunication system terminal for a frequency shift-keyed system utilizing high frequency band mark and space frequencies for transmission in one direction and low frequency band mark and space frequencies for transmission in the opposite direction, means connected to an input of said terminal for discriminating between at least the mark and space frequencies in one of said bands, said discriminating means having a control signal input for receiving a signal at a frequency which is N times one of the last-mentioned mark and space frequencies for determining the band of the discriminating means operation, means for dividing the frequency of a signal at an input of said dividing means by a factor N to produce an output from said terminal, means for providing selectable frequency signals each being N times a different one of said mark or space frequencies, and means for interchangeably providing said selectable frequency signals of said high and low bands to said dividing means input and to said discriminating means control signal input, respectively.

3. The terminal in accordance with claim 2 in which said discriminating means comprises a commutating capacitor unit bandpass filter connected to said terminal input, said filter being a three-element, π-section filter with a reactive impedance connected in the series signal path thereof, an EXCLUSIVE OR circuit, means for coupling different terminals of said reactive impedance to different inputs of said EXCLUSIVE OR circuit, and means for applying signals at said control signal input for providing capacitor commutation drive signals to respective commutatable capacitor units of said filter.

4. The terminal in accordance with claim 2 in which said selectable frequency signal providing means comprises an oscillator, a first countdown circuit responsive to the output of said oscillator for providing mark and space signals in one of said bands to the input of said frequency dividing means, a second countdown circuit responsive to the output of said oscillator for providing at least one selectable frequency in another of said bands to said discriminator control input, and means for separately controlling countdown ratios of said first and second countdown means, and said interchanging means comprises means for interchanging the controlling means for said first and second countdown circuits and for substantially simultaneously interchanging the dividing means and discriminating means output signal destinations of said countdown circuits.

5. The terminal in accordance with claim 4 in which said discriminating means comprises a commutating capacitor unit bandpass filter connected to said terminal input, said filter being a π-section filter with a reactive impedance connected in the series signal path thereof, an EXCLUSIVE OR circuit, means for coupling different terminals of said reactive impedance to different imputs of said EXCLUSIVE OR circuit, and means for applying signals at said control signal input for providing capacitor commutation drive signals to respective commutatable capacitor units of said filter.

6. In a frequency duplex telecommunication system terminal for a frequency shift-keyed system utilizing high frequency band mark and space frequencies for transmission in one direction and low frequency band mark and space frequencies for transmission in the opposite direction, a first controllable-frequency signal producing circuit for supplying signals related to the mark and space frequencies in one of the bands, an information signal input for controlling the producing circuit, a coupling circuit responsive to output of the producing circuit for applying information represented by those signals to an output of the terminal in the form of a signal train including those mark and space frequencies of the one band, a frequency discriminator for producing information signals in response to mark and space frequencies in the other of the bands at an input of the terminal, and the terminal being CHARACTERIZED IN THAT a second controllable frequency signal producing circuit is provided like the first such circuit except that it supplies signals related to the mark and space frequencies in the other of the bands, a bias signal input controls the second producing circuit, the discriminator operates in one or the other of the frequency bands depending upon the frequency of a control signal applied thereto, a circuit couples an output of the second producing circuit to control the band of operation of the discriminator, and switches are provided for switching terminal transmitting and receiving bands of operation of the terminal by interchanging the first and second producing circuits.

7. In combination, controllable means for providing at different outputs thereof a selectable two of four frequencies, two of the four frequencies being in a first band and the other two being in a second nonoverlapping band, the selectable two frequencies always being in different bands, first means for coupling one of said two providing means outputs to produce frequency shift-keyed data signals, means, responsive to received frequency shift-keyed data signals, for producing baseband data signals corresponding to said frequency shift signals in a selectable frequency band determined by the frequency of a control signal, second means for coupling another of said two providing means outputs to produce said control signal, and means for interchanging said providing means outputs utilized by said first and second coupling means.

8. The combination in accordance with claim 7 in which said first coupling means is a frequency divider, said producing means is a frequency discriminator, and the division factor of said divider is equal to the multiplication factor by which the discriminator control signal is higher than a frequency of the band received thereby.

9. The combination in accordance with calim 7 in which said providing means comprise means for producing an oscillation signal of predetermined frequency, a first countdown circuit controllable for reducing said predetermined frequency to either of two frequencies in an intermediate frequency band, each of the latter frequencies being N times a different one of the two frequencies in one of said bands, N being an integer, and a second countdown circuit controllable for reducing said predetermined frequency to either of two frequencies in an intermediate frequency band, each of the latter frequencies being N times a different one of the two frequencies in the other of said bands.

10. The combination in accordance with claim 9 in which none of said four frequencies is an integral factor of said predetermined frequency, and each of said countdown circuits comprises means for recurrently modifying the frequency division ratio thereof so that, on the average over a bit interval of said baseband signals, each of said four frequencies is approximately an integral factor of said predetermined frequency.

11. In a frequency duplex telecommunication system terminal for a frequency shift-keyed system utilizing high frequency band mark and space frequencies for transmission in one direction and low frequency band mark and space frequencies for transmission in the opposite direction, a commutatable capacitor unit bandpass filter connected to receive signals at an input of said terminal, said filter being a three-element, π-section filter with a reactive impedance connected in the series signal path thereof, an EXCLUSIVE OR circuit, means for coupling different terminals of said reactive impedance to different inputs of said EXCLUSIVE OR circuit, and means for applying capacitor commutation drive signals to respective commutatable capacitor units of said filter.

12. The terminal in accordance with claim 11 in which said mark and space frequencies in both bands are chosen to have the same difference frequency between them, and the reactance value of said impedance is chosen so that voltages at the terminals of said impedance are in a cophasal relation in response to the higher of said mark and space frequencies in either of said bands and are in an antiphasal relation in response to the lower of such frequencies.

13. The terminal in accordance with claim 11 in which said EXCLUSIVE OR circuit has a predetermined range of possible input threshold levels of operation for its inputs, and said coupling means comprises first and second amplitude limiters connected in series in the respective inputs of said EXCLUSIVE OR circuit, said limiters having substantially the same threshold of operation at an amplitude at least as high as the highest anticipated input threshold of said EXCLUSIVE OR circuit.

14. The terminal in accordance with claim 11 in which said coupling means comprises first and second low-pass filter means connected in series between respective ones of said impedance terminals and respective ones of the inputs of said EXCLUSIVE OR circuit, said filter means each having a cutoff frequency selected for substantially smoothing out voltage steps in sine wave approximation signals at said impedance terminals.

15. The terminal in accordance with claim 11 in which means are provided, at the output of said EXCLUSIVE OR circuit, for low-pass filtering signals at the output thereof, said filtering means having a cutoff frequency at about the information bit rate of signals at said terminal input.

16. The terminal in accordance with claim 15 in which said coupling means comprises first and second low-pass filter means connected in series between respective ones of said impedance terminals and respective ones of the inputs of said EXCLUSIVE OR circuit, said filter means each having a cutoff frequency selected for substantially smoothing out voltage steps in sine wave approximation signals at said impedance terminals.

17. The terminal in accordance with claim 16 in which said EXCLUSIVE OR circuit has a predetermined range of possible input threshold levels of operation for its inputs, and said coupling means comprises first and second amplitude limiters connected in series in the respective inputs of said EXCLUSIVE OR circuit, said limiters having substantially the same threshold of operation at an amplitude at least as high as the highest anticipated input threshold of said EXCLUSIVE OR circuit.

* * * * *

UNITED STATES PATENT OFFICE
CERTIFICATE OF CORRECTION

Patent No. 3,846,582 Dated Nov. 5, 1974

Inventor(s) Joseph H. Condon and William Kaminski

It is certified that error appears in the above-identified patent and that said Letters Patent are hereby corrected as shown below:

In the Abstract, line 14, "reproduce" should read --produce--.

Col. 7, line 5, "Q", second occurrence, should read --$\overline{Q}$--; line 7, "Q" should read --$\overline{Q}$--. Col. 10, Claim 9, line 31, "calim" should read --claim--.

Signed and sealed this 14th day of January 1975.

(SEAL)
Attest:

McCOY M. GIBSON JR.
Attesting Officer

C. MARSHALL DANN
Commissioner of Patents